US006735212B1

(12) United States Patent
Calamvokis

(10) Patent No.: US 6,735,212 B1
(45) Date of Patent: May 11, 2004

(54) SHORT AND LONG TERM FAIR SHUFFLING FOR CROSSBAR SWITCH ARBITER

(75) Inventor: Costas Calamvokis, Mountain View, CA (US)

(73) Assignee: PMC-Sierra, Inc., Burnaby (CA)

( * ) Notice: Subject to any disclaimer, the term of this patent is extended or adjusted under 35 U.S.C. 154(b) by 0 days.

(21) Appl. No.: 09/549,878

(22) Filed: Apr. 17, 2000

Related U.S. Application Data

(60) Provisional application No. 60/130,406, filed on Apr. 19, 1999.

(51) Int. Cl.[7] .............................................. H04L 12/56
(52) U.S. Cl. ..................... 370/412; 370/386; 370/462
(58) Field of Search ............... 370/412–4, 416, 370/418, 352–6, 458, 461, 462, 386, 389

(56) References Cited

U.S. PATENT DOCUMENTS

| 4,630,045 | A | | 12/1986 | Georgiou | 340/825.79 |
|---|---|---|---|---|---|
| 5,072,366 | A | | 12/1991 | Simcoe | 395/200 |
| 5,517,495 | A | * | 5/1996 | Lund et al. | 370/399 |
| 5,734,649 | A | | 3/1998 | Carvey et al. | 370/355 |
| 6,370,148 | B1 | * | 4/2002 | Calvignac et al. | 370/412 |

OTHER PUBLICATIONS

Tamir, Yuval, "Symmetric Crossbar Arbiters for VLSI Communication Switches," *IEEE Transactions on Parallel and Distributed Systems*, vol. 4, No. 1, pp. 13–27 (1993).

* cited by examiner

*Primary Examiner*—Chi Pham
*Assistant Examiner*—Derrick W Ferris
(74) *Attorney, Agent, or Firm*—Townsend and Townsend and Crew LLP

(57) ABSTRACT

A method and system including a short and long term fair shuffling procedure in an arbitration algorithm for a crossbar switch. The shuffling algorithm is deterministic, rather than random, in nature. The shuffling sequence is chosen to ensure a high level of short-term fairness. To ensure long-term fairness, all permutations are eventually used. Both row (input) and column (output) shufflers are used to shuffle priorities of requests. In a preferred embodiment, permuters and shifters are utilized in the shuffler circuits.

4 Claims, 14 Drawing Sheets

SHORT AND LONG TERM FAIR SHUFFLING FOR CROSSBAR SWITCH ARBITER

RELATED APPLICATIONS

This application claims priority based on U.S. provisional application Serial No. 60/130,406 with filing date Apr. 19, 1999.

BACKGROUND OF THE INVENTION

1. Field of the Invention

The present invention relates generally to packet switched data handling systems and, more particularly, to a high speed router or ATM (asynchronous transfer mode) switch employing a crossbar type switch controlled in a manner which can very rapidly and efficiently allocate available connection points.

2. Description of the Background Art

There is increasing interest in providing communications between disparate computer systems and even between networks of differing characteristics. Further, with the availability of very high bandwidth trunk lines, e.g., using fiber optic cables, there is increasing interest in combining traffic from a great variety of sources for transmission through a single trunk line. For wide area networks, packet switching technology is widely used where information to be transmitted is broken into packets of data which are preceded by headers containing information useful in routing. The header may also identify the source and the destination. Whether truly packet switched or not, most digital communication systems employ message formats in which there is an identifying header of some sort.

As is well known, data network usage is expanding at a great rate both in terms of private networks and also public networks such as the Internet. While transmission link bandwidths keep improving, the technology of the systems which connect the links has lagged behind. In particular, routers are needed which can keep up with the higher transmission link bandwidths. A high speed router needs to achieve three goals. First, it needs to have enough internal bandwidth to move packets between its input and output interfaces at the desired rates. Second, it needs enough packet processing power at the interfaces to forward the packets and, third, the router needs to be able to redirect the packets between possible paths at the requisite rates.

Conventional routers are bus based, that is, a high speed bus is provided which can link a single input to a single output at one time. The router of the present invention utilizes a crossbar switch type interconnection scheme between inputs and outputs.

One problem which exists in the context of packet switching via a crossbar switch is the allocation of available paths through the crossbar. As is understood by those skilled in the art, for unicast traffic, only a limited number of switch points can be utilized at any one time since a single input should not be connected to more than one output at a given time and, likewise, each output should only be connected to a single input.

Allocation of the available paths through a crossbar switch is performed by a device called an arbiter. An arbiter is so named because it resolves (arbitrates) conflicting resource demands. Such arbiters are discussed, for example, in the publication "Symmetric Crossbar Arbiters for VLSI Communication Switches," by Yuval Tamir and Hsin-Chou Chi, *IEEE Transactions on Parallel and Distributed Systems*, Vol. 4, No. 1, 1993 [hereinafter "Tamir and Chi (1993)"], the disclosure of which is incorporated by reference.

In order to provide high efficiency and throughput, an arbiter has to operate at very high speed in determining which of competing possibilities will be accommodated. Further, in many circumstances, the arbiter is preferably fair in the sense it does not overly favor one source or destination over another or one form of data communication over another. Given that very disparate patterns can exist in data communication demands, particularly when accommodating data originating from disparate systems, the allocation problem is not a simple one.

One prior art system for allocating crossbar connection points is described in U.S. Pat. No. 5,734,649, titled "Data Packet Router," with named inventors Philip Carvey and Thomas Clarke. As described in that patent, sources are assigned in accordance with a first pseudo-random shuffle pattern, and destinations are assigned in accordance with a second pseudo-random shuffle pattern. A new set of pseudo-random shuffle patterns is generated for each interval. An incremental testing is performed across the data array to locate matches not previously allocated and each match found is successively allocated to the switch element corresponding to the data element. After testing, the complete array of switch elements are operated during a subsequent interval in accordance with the previously determined allocations.

However, the prior art system has substantial drawbacks. First, the prior art system is based on pseudo-random numbers and so merely tends to be fair; actual long-term fairness in the allocation of switching resources is not necessarily ensured by the prior art system.

Second, short-term fairness is not provided by the prior art system. Because the prior art switching algorithm is random in nature, the likelihood of short-term unfairness is built into the prior art process. The likelihood of short-term unfairness is to be expected from any random process. For example, short-term unfairness exists when a "pass" or "don't pass" streak occurs when rolling dice in a game of craps. While the expected distribution is close to 50-50 for "passes" or "don't passes" in that game, several passes or don't passes in a row frequently occur. For example, over say 20 rolls of the dice, 10 passes and 10 don't passes may be expected according to probability, but the actual number of passes is likely to outnumber the number of don't passes, or vice-versa.

SUMMARY OF THE INVENTION

The present invention provides a method and system that overcome the above described problems and disadvantages. The method and system includes a short and long term fair shuffling procedure in an arbitration algorithm for a crossbar switch.

In accordance with the present invention, the shuffling algorithm is deterministic, rather than random, in nature. The shuffling sequence is chosen to ensure a high level of short-term fairness. To ensure long-term fairness, all permutations are eventually used.

Further in accordance with the present invention, both row (input) and column (output) shufflers are used to shuffle priorities of requests. In a preferred embodiment, permuters and shifters are utilized in the shuffler circuits.

BRIEF DESCRIPTION OF THE DRAWINGS

The teachings of the present invention can be readily understood by considering the following detailed description in conjunction with the accompanying drawings.

DESCRIPTION OF THE SPECIFIC EMBODIMENTS

I. Crossbar-Based Switch Core

Figure 1:
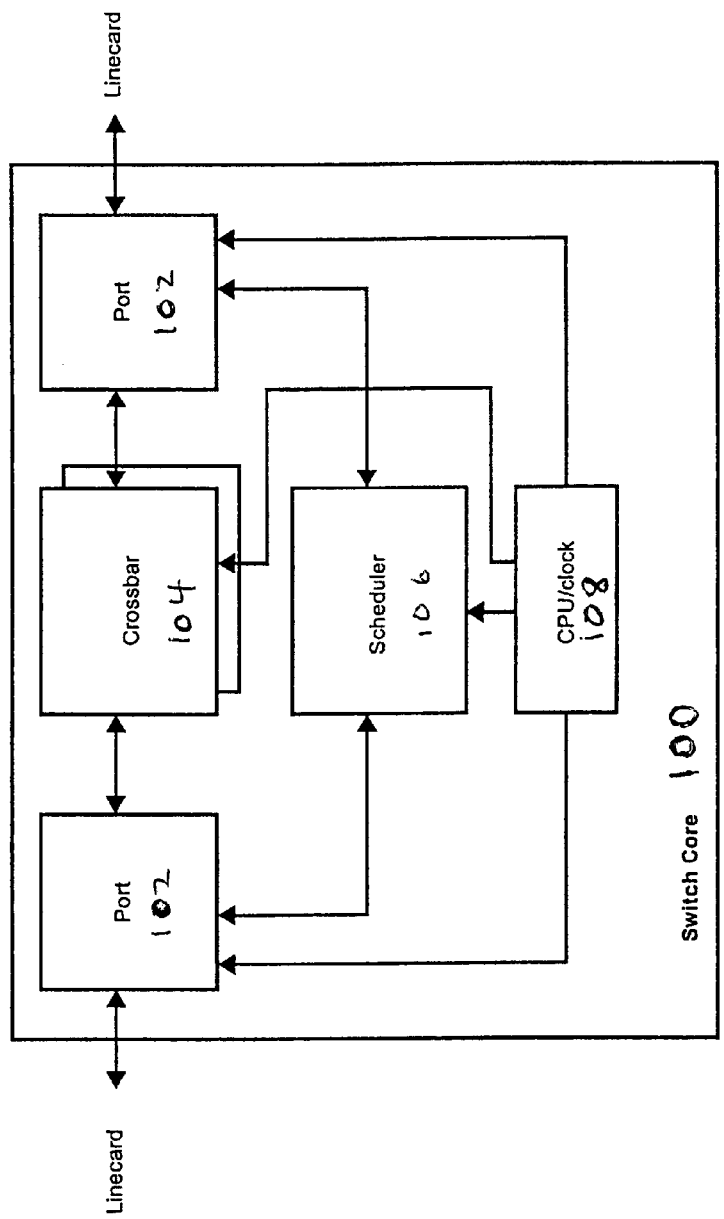
FIG. 1 is a block diagram depicting logical interconnects of a crossbar-based switch core 100 in accordance with a preferred embodiment of the present invention.

FIG. 1 is a block diagram depicting logical interconnects of a crossbar-based switch core 100 in accordance with a preferred embodiment of the present invention. The switch core 100 includes four types of devices: port 102, crossbar 104, scheduler 106, and CPU/clock 108. There may be one or more instances of each device within the switch core 100. For example, each device may be implemented as a separate circuit board, with each circuit board interconnected via a single midplane circuit board.

Each port 102 is coupled to one or more linecards which are outside the switch core 100. In a preferred embodiment, the ports 102 include shallow queues and implement a linecard-to-switch (LCS) protocol.

The ports 102 may have shallow (e.g., 64 cell) queues in both ingress and egress directions. These queues may compensate for the latency between the linceard and the core 100. In one perspective, such queues act as extensions of queues within the linecards.

A LCS protocol may provide an interface between the linecard and the switch core 100. In a preferred embodiment, the LCS protocol has per-queue, credit-based flow control which ensures that queues are not overrun. A preferred embodiment for a LCS protocol is described in commonly owned U.S. patent application Ser. No. 09/303,765, entitled "Packet Switch System," filed Apr. 29, 1999, with co-inventors Nicholas McKeown, Costas Calamvokis, Shang-Tse Chuang, and Steven Lin, the disclosure of which is incorporated by reference.

The ports 102 and scheduler 106 exchange information about cells that are waiting to be forwarded through the crossbar 104. A cell is a fixed-length packet. the scheduler 106 maintains local information on the number of cells that are waiting in all of the ingress queues. In addition, the scheduler 106 instructs the ports 102 as to which cell they can forward through the crossbar 104 at each cell time (or interval).

Furthermore, the scheduler 106 includes an arbiter which arbitrates amongst all cells in the ingress queues. In accordance with a preferred embodiment of the present invention, the arbiter comprises a wrapped wavefront arbiter (WWFA). Such a WWFA is described below and also in Tamir and Chi (1993).

In a preferred embodiment, the crossbar 104 includes the following features. It bidirectionally interconnects all of the ports with all of the other ports so as to enable cells to be forwarded from an ingress queue in one port to an egress queue in any different port. In addition, the crossbar 104 is reconfigured at every cell time to provide any non-blocking mapping from inputs to outputs. Each input/output of the crossbar 104 receives its mapping information via its attached port 102 since the crossbar 104 does not communicate directly with the scheduler 106.

The CPU/clock 108 includes a clock which provides clock signals and cell boundary information to every "core device." "Core devices" being defined so as not to include the CPU/clock 108 itself. The CPU/clock 108 also includes a local CPU which can read and write state information to other switch cores via an out-of-band (OOB) bus.

The switch core 100 includes four "core devices": dataslices (DS) 202 and port processors (PP) 204 within the ports 102, the scheduler (Sched) 106, and the crossbar (Xbar) 104. the following describes how cells flow through these four devices.

Figure 2:
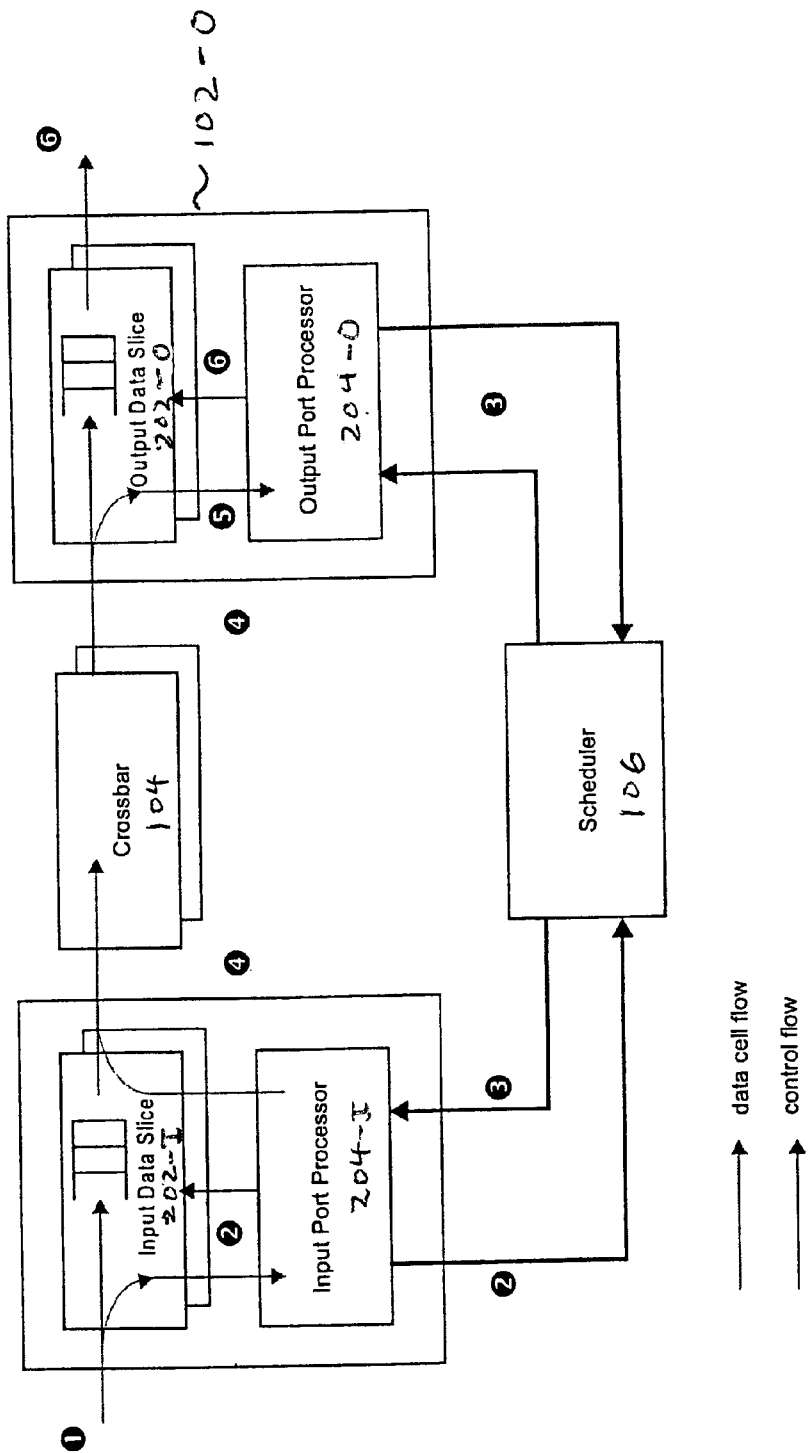
FIG. 2 depicts cell and control flows in a two-port configuration of a switch core 100 in accordance with a preferred embodiment of the present invention.

FIG. 2 depicts cell and control flows in a two-port configuration of a switch core 100 in accordance with a preferred embodiment of the present invention. Only the input side of the left port 102 and the output side of the right port 102 are shown. In a preferred embodiment, each port has one PP 204 and either six or seven DS 202 devices. the DS includes the cell queue memory and also has the interface to the linecard. A single cell is "sliced" across all of the DS. 202 devices, each of which can manage two slices. The PP 204 functions as the controller and determines where cells should be stored in the DS 202 memories. Multiple crossbar 104 devices make up a full crossbar. A single scheduler 106 device can arbitrate for the entire core 100.

A cell tranverses the switch core in the following sequence of events which are illustrated in FIG. 2.

(1) The cell arrives at the source DS 202-I from the linecard. The LCS header portion of the cell is copied to the source PP 204-I.

(2) The source PP 204-I determines the destination queue from the LCS header. The source PP 204-I then instructs the source data slices 202-I where to store the cell (each data slice 202 stores part of the cell). The source PP 204-I also informs the scheduler 106 that a new cell has arrived so that the schedular 106 may add it to the list of cells waiting to be forwarded through the crossbar 104. The source PP 204-I modifies the LCS label by replacing the destination port 1020-O with the source port 102-I (so the egress port may see which port sent the cell).

(3) The scheduler 106 arbitrates among all queued cells and sends a grant to those ports 102-I that can forward a cell. The scheduler 106 also sends a routing tag to each of the destination (egress or output) port 102-O. The routing tag indicates to the ports which of the many source (ingress or input) ports 102-I will be sending it a cell.

(4) The source PP 204-I sends a read command to the data slices 202-I, which then read the cell from the appropriate queue and sent it to the crossbar 104. At a same or similar time the destination ports 102-O send the routing tag information to the crossbar 104. This routing tag information is used to configure the internal connections within the crossbar 104 for the duration of one cell time. The cell then flows through the crossbar from the source port 102-I to the destination port 102-O.

(5) The cell arrives at the destination port 102-O, and the destination PP 204-O reads the header of the cell. It uses this information to decide in which egress queue the cell should be stored.

(6) At some later time the destination PP 204-O determines that it is time to forward the cell to the linecard. At that time, the destination PP 204-O sends a read command to the destination data slices 202-O which read the cell from memory and forward the cell out to the linecard.

Note that the above description does not describe all of the interactions that take place. Rather, it describes the overall flow between the devices.

Figure 3:
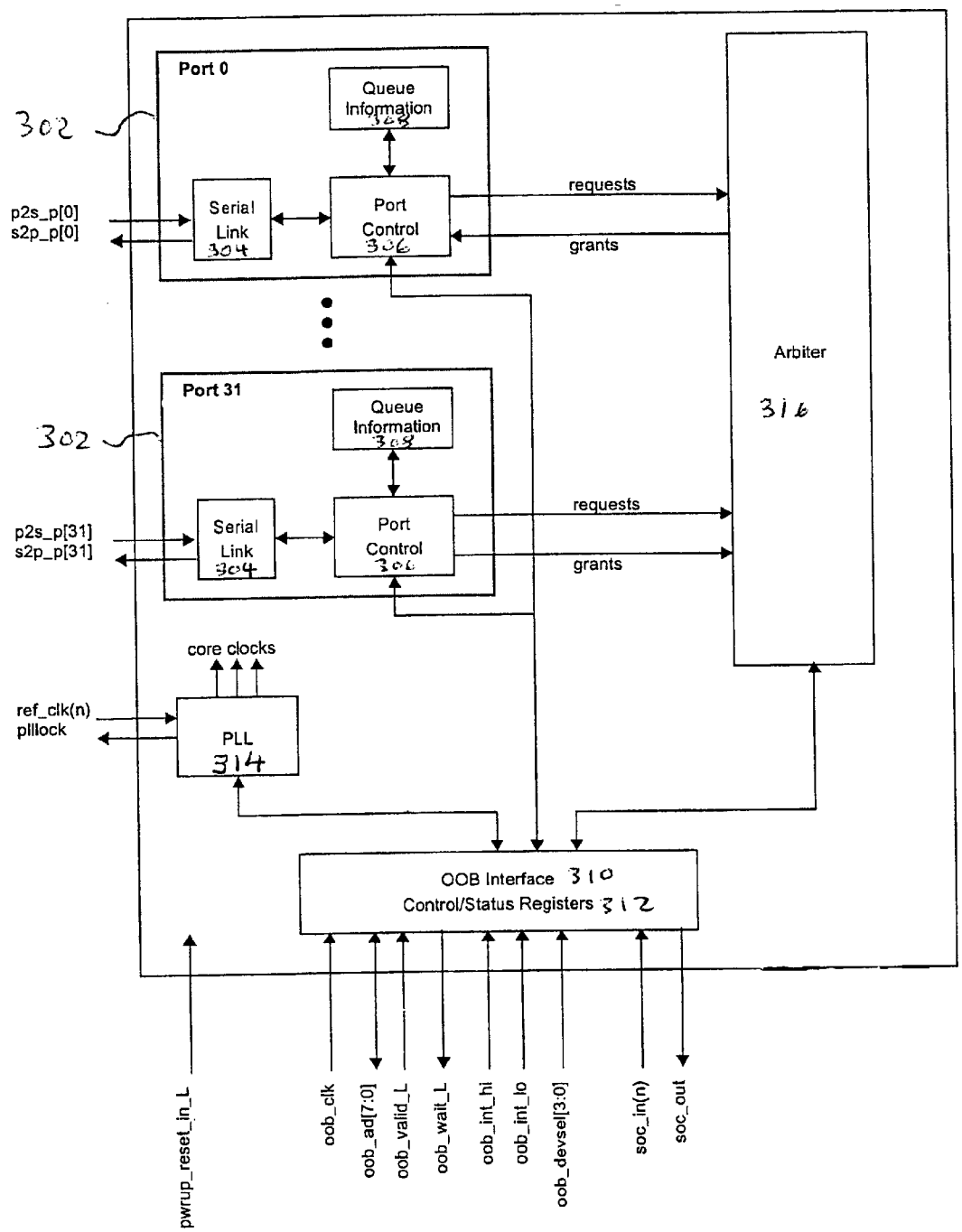
FIG. 3 is a block diagram depicting a scheduler 106 in accordance with a preferred embodiment of the present invention.

II. Scheduler p FIG. 3 is a block diagram depicting a scheduler 106 in accordance with a preferred embodiment of the present invention. In one preferred embodiment, the scheduler 106 can arbitrate between thirty-two ports of OC 192. (OC=Optical Carrier.)

The state associated with each port 102 is maintained in a port block 302. Each port block 302 (numbered Port 0 through Port 31 in FIG. 3) contains a serial link 304, a port control unit 306, and queue information memory 308. The serial link 304 provides a full duplex (1.6 Gb/s in a preferred embodiment) communications channel to a corresponding port processor 204. This channel is used to send new request and backpressure information to the scheduler 106, and to send grant and routing tag information to the port processor 204. The port control unit 306 provides a set of registers that indicate the current status of many elements of the port block 302 and that can also be used to control behavior (states) of the port block 302. The queue information memory 308 holds a number of outstanding requests for every queue associated with this port 302.

The scheduler 106 includes an out-of-band (OOB) interface 310. The OOB interface 310 allows a single local CPU 108 to control and monitor all switch cores 100 within a switch fabric. The scheduler 106 also includes control/status registers 312. These registers 312 can be mapped into the memory address space of the CPU 108.

Also included in the scheduler is a phase-locked loop (PLL) 314. The PLL 314 generates core clock signals for timing purposes within the core.

An arbiter 316 in the scheduler 106 receives information from each of the port blocks 302. This information indicates which of the virtual output queues in each port 102-I have cells waiting to be forwarded to their appropriate destination port 102-O. At every cell time, the arbiter 316 combines these inputs to decide which ports 102-I can forward a cell at some fixed time in the future. The resulting set of grants is then passed back to the port blocks 302.

In a preferred embodiment of the present invention, the arbiter 316 utilizes an enhanced version of a WWFA algorithm. As described further below, the enhancement includes the use of an advantageous shuffling procedure.

III. Arbiters

A. Wave Front Arbiter (WFA)

Figure 4:
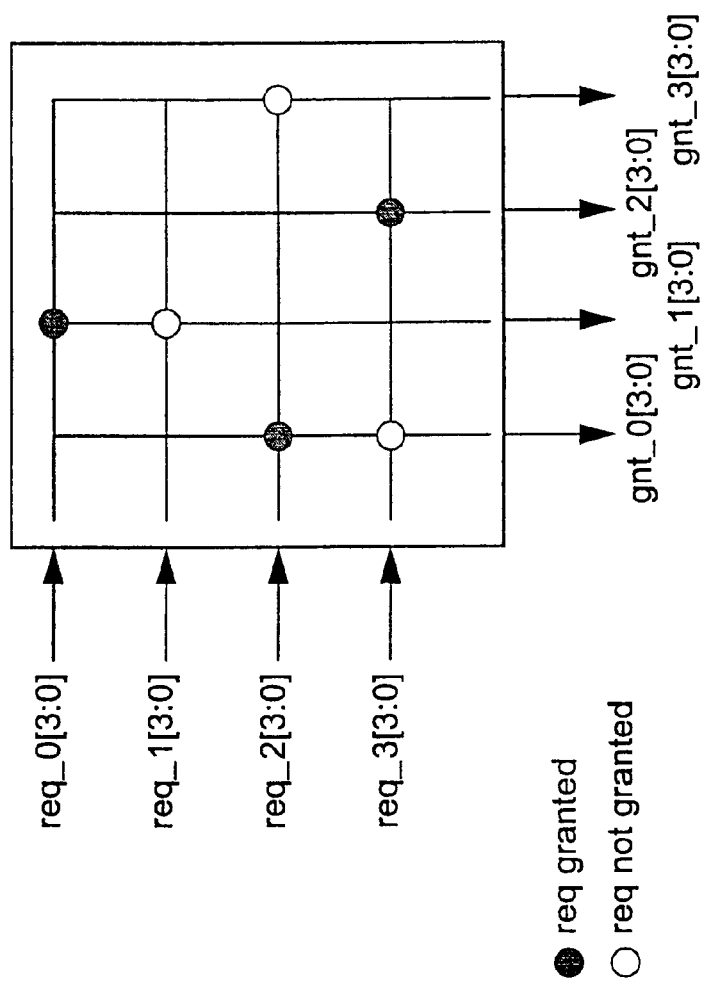
FIG. 4 illustrates operation of a 4×4 WFA.

First, consider a basic (not wrapped) wave front arbiter (WFA). The WFA includes a block of combinatorial logic that decides which input gets to connect to which output of the crossbar 104. In the basic WFA, the inputs and outputs have an inherent priority as a result of their relative positions. FIG. 4 illustrates operation of a 4×4 WFA.

As illustrated in FIG. 4, each input can request any and all outputs simultaneously. So we see input 2 has a cell to send to output 0 and another cell to send to output 3. An input is granted or not granted a request based on its physical position. Hence, we see that both input 0 and input 1 are requesting output 1, but input 0 is granted the output because input 0 is at a higher priority since it is "above" input 1. Also, input 2 has requests for output 0 and output 3, but input 2 is connected to output 0 because output 0 has a higher priority since it is "left" of output 3.

Figure 5:
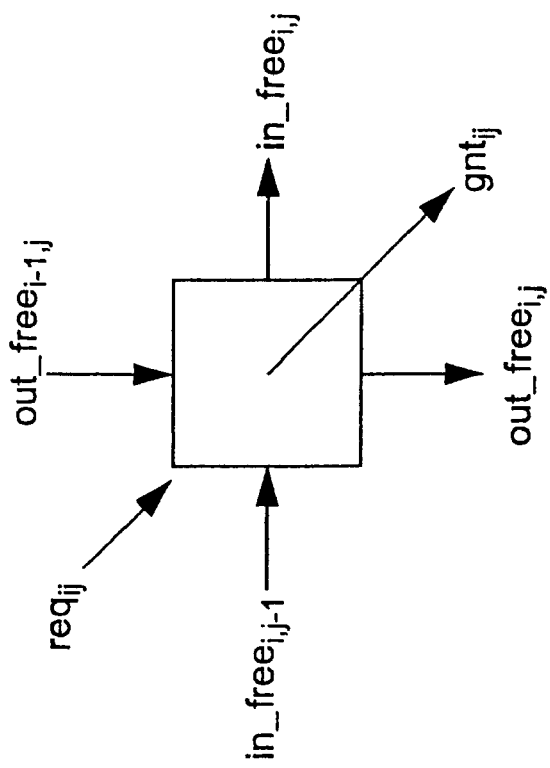
FIG. 5 illustrates inputs and outputs at each crosspoint.

Internally each crosspoint has some simple combinatorial logic that decides whether the cross-point is "set" i.e. the request is granted. FIG. 5 illustrates inputs and outputs at each crosspoint. As shown, each crosspoint at row i column j has to have:

an input (in_free$_{i,j-1}$) from the left which indicates whether the requesting input (row i) has already been granted an output;

an input (out_free$_{i-1,j}$) from above which indicates whether this output (column j) has already been granted;

an input request Req$_{ij}$ indicating whether input i has a request for output j;

a grant output Gnt$_{ij}$ which indicates whether the request is granted. This grant is then fed out to a grant decoder; and an output (in_free$_{i,j}$) which indicates whether this input has been granted an output.

The logic within each crosspoint is combinatorial. So the arbitration decision proceeds as a wave, starting at the top left, and fanning out down and right until it gets to the bottom right crosspoint, hence the term "wave front."

Figure 6:
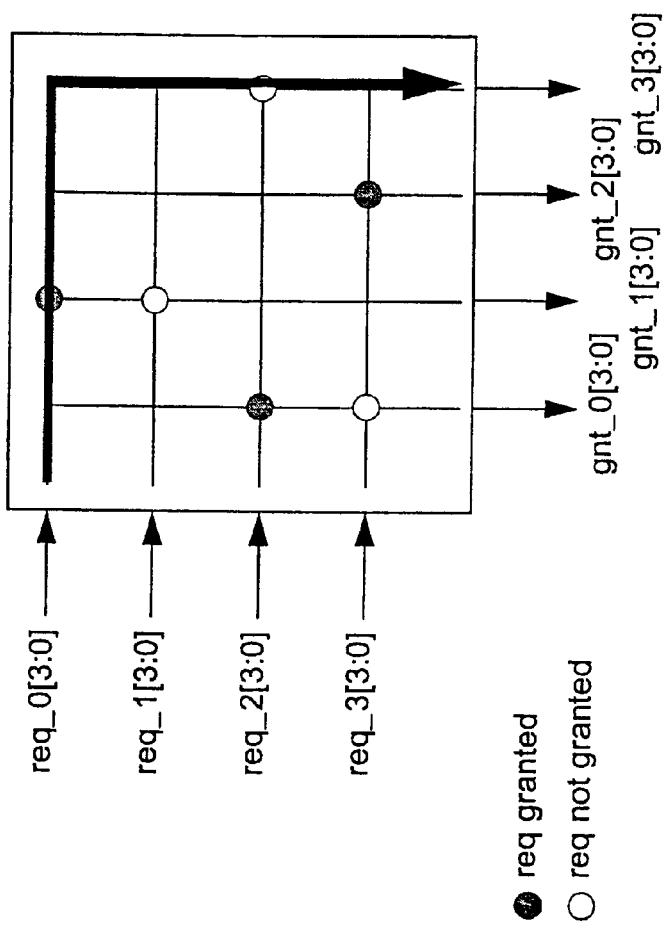
FIG. 6 illustrates a worst case delay in a 4×4 WFA.

The decision time for an arbiter is the time for each grant to be validated. For the WFA, the worst case delay is from req$_{0,0}$ to gnt$_{3,3}$ as shown in FIG. 6. In this example, the worst case delay is seven (or generally 2n−1 for a nxn crossbar) crosspoint delay units.

B. Wrapped WFA (WWFA)

Figure 7:
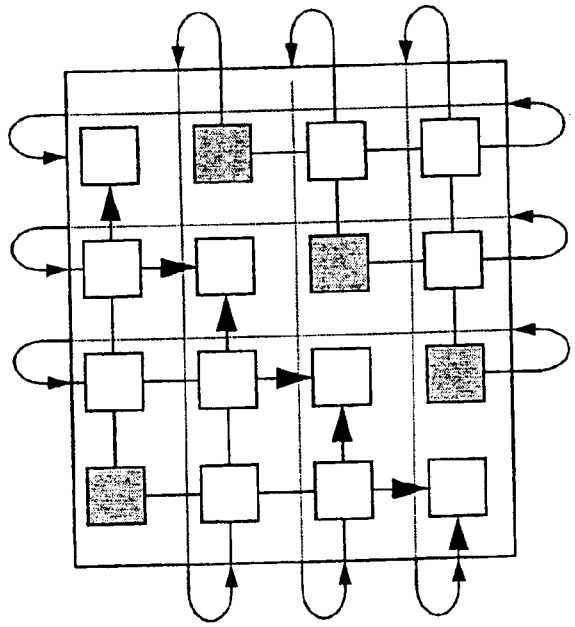
FIG. 7 illustrates wrapping in a WWFA.

One problem with the WFA is its relatively long decision time. This can be substantially reduced (by nearly half) with a neat trick. The "trick" is to observe that half of the delay is the "down" path: the arbitration for column j cannot start until in_free 0,j has been determined. However, if we start the column arbitration from different rows then all four column arbitrations can start immediately. FIG. 7 shows the change. FIG. 7 illustrates wrapping in a WWFA. The shaded square indicates the starting point for each column arbitration. Note that in_free and out_free must now wrap back round—hence the term "Wrapped" WFA (or WWFA).

In the 4×4 WWFA, all paths are the same delay wise—four crosspoints of delay. However, the relative priorities have changed. Input 0 is still the highest priority for output 0, but it has become the lowest priority for output 3. Input 1 is now the highest priority request for output 3 (the starting point).

IV. Shufflers

Shuffling is needed because the WWFA forces inputs and outputs to have a fixed priority relative to each other. For example, if port 0 always drives request0 then it would always have priority over the other inputs. Hence, in order to achieve fairness in priority, shuffling is performed on the requests. Of course, because the requests are shuffled, it is necessary to de-shuffle the grants to make sure they go back to the correct ports.

Many shuffling or sequencing procedures could be used, including pseudo-random shuffling or round-robin sequencing. It would appear at first glance that either a pseudo-random shuffling or a round-robin sequence could achieve fairness. However, neither give both long term and short term fairness reliably.

A. Round Robin Shuffling

A round-robin shuffling sequence generally has built-in unfairness between pairs of ports. This is because in a round-robin sequence, for example, port A may have a higher priority than port B n−1 cell times for every cell time that port B has a higher priority than port A. This unfairness manifests itself both short and long term.

B. Pseudo-Random Shuffling

A pseudo-random shuffler can in theory give long-term fairness, but will not-in general-give short-term fairness. The reason for this and other drawbacks to pseudo-random shuffling are described above in the background section.

C. Short and Long Term Fair Shuffling

The present invention relates to a deterministic shuffling procedure which provides both short-term and long-term fairness. A specific and preferred embodiment for a deterministic shuffling procedure providing short- and long-term fairness is described below. However, variations and modifications to the specific embodiment may be made by those of skill in the art and such variations and modifications are within the spirit and scope of the present invention.

1. Overview of Request Shuffler

In general, the shuffling of requests may be split into three pieces. First, there is how the shufflers themselves route requests from their inputs to their outputs. Second, there are the controllers that control the shuffle. Third, there is how the controllers are advanced as time progresses.

The input to the shufflers can be thought of as a two dimensional array of requests, with each row being the requests from a particular input and each column begin the requests for a particular output. So for a four way switch the matrix might look like this:

0010
0010
0000
0000

Which indicates that input ports 0 and 1 are requesting output port 2. The shufflers work by first rearranging the columns, so the requests might look like this:

1000
1000
0000
0000

And then rearranging the rows, which might give this:

1000
0000
1000
0000

Although this description nearly always talks about shuffling requests, remember also that the grants have to be deshuffled.

In accordance with a preferred embodiment, the shufflers consist of a number of permuters and shifters. The permuters can route any of their inputs to each of their outputs so there are N! possible useful configurations that they can have (where N is the size of the permuter). The shifters each produce a rotated version of their inputs on their outputs, so there are only M possible configurations that each shifter can have (where M is the size of the shifter).

Consider, for example, column and row shufflers for a 32×32 crossbar switch. In accordance with a preferred embodiment, first the columns are shuffled and then the rows are shuffled. In this particular example, the column shufflers comprises of four 8 way permuters. The row shufflers have an additional shifter following the permuters.

2. Row Shuffler Circuit

Figure 8:
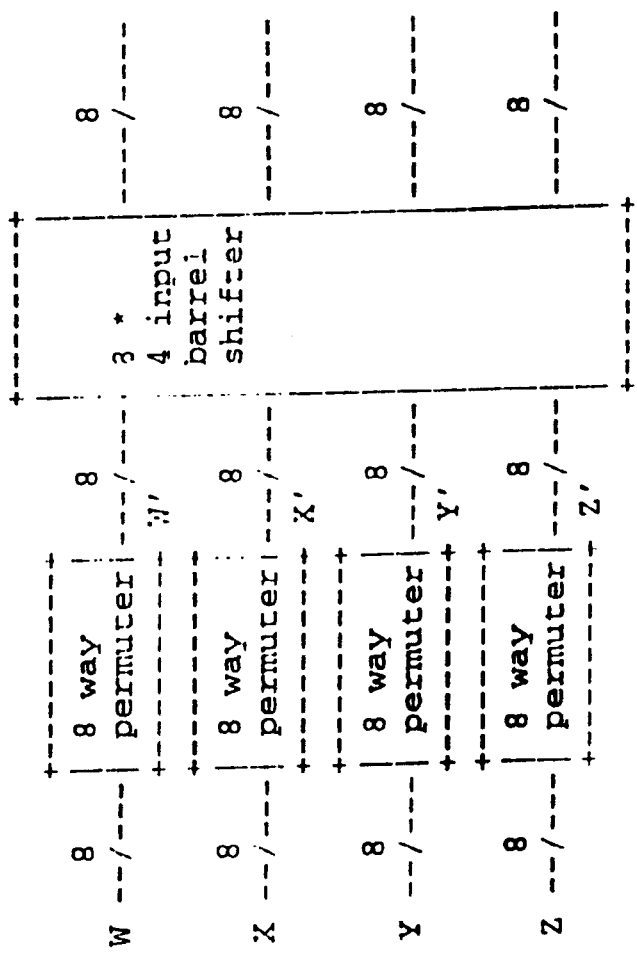
FIG. 8 illustrates a circuit for shuffling rows within a column in accordance with a preferred embodiment of the present invention.

The circuit for shuffling the rows within a column is illustrated in FIG. 8. Note that this shuffler is called a row shuffler because it shuffles the rows within a single column (this may be confusing because there is an equally good case for calling it a column shuffler).

The eight way permuters just take their input and can produce it at their output in any permutation (8! ways). Thus W' can be any permutation of W. The four permuters share the same set of control signals, so the permutation of W→W',X→X',Y→Y' and Z→Z' are the same in any arbitration.

The barrel shifter isn't a single 32 bit barrel shifter, but eight 4 input ones. Each shifter takes one bit of W',X',Y' and Z' and has its own control input.

The permuters are controlled by eight 3 bit signals: control_0[2:0] to control_7[2:0]. Each control signal controls a mux that feeds one of the outputs, control_0 controlling output[0] and so on. The shuffler controller has to ensure that all of the control signals are different so that each of the inputs ends up at one output.

The barrel shifters are controlled by sixteen 2 bit signals, each of which controls the degree of the shift of one of the shifters. The values for on control input correspond to the following:

shifter_control=0 no shift
shifter_control=1 rotate right 8
shifter_control=2 rotate right 16
shifter_control=3 rotate right 24 where shifter_control_0 controls the rotation of bits 0, 8, 16 and 24 of the incoming 32 bit word, and so on.

Here are some examples:
Example 1) If
shifter_control_0=0
shifter_control_1=0
shifter_control_2=0
shifter_control_3=0
shifter_control_4=0
shifter_control_5=0
shifter_control_6=0
shifter_control_7=0
permuter_control_0=0
permuter_control_1=1
permuter_control_2=2
permuter_control_3=3
permuter_control_4=4
permuter_control_5=5
permuter_control_6=6
permuter_control_7=7

Then the requests are passed through unchanged. The unchanged input and output columns being:

| | |
|---|---|
| input: | 3 3 2 2 2 2 2 2 2 2 2 2 1 1 1 1 1 1 1 1 1 1 0 0 0 0 0 0 0 0 0 0 |
| | 1 0 9 8 7 6 5 4 3 2 1 0 9 8 7 6 5 4 3 2 1 0 9 8 7 6 5 4 3 2 1 0 |
| output: | 3 3 2 2 2 2 2 2 2 2 2 2 1 1 1 1 1 1 1 1 1 1 0 0 0 0 0 0 0 0 0 0 |
| | 1 0 9 8 7 6 5 4 3 2 1 0 9 8 7 6 5 4 3 2 1 0 9 8 7 6 5 4 3 2 1 0 |

Example 2) If
shifter_control_0=1
shifter_control_1=1
shifter_control_2=1
shifter_control_3=1
shifter_control_4=1
shifter_control_5=1
shifter_control_6=1
shifter_control_7=0
permuter_control_0=1
permuter_control_1=0
permuter_control_2=2
permuter_control_3=3
permuter_control_4=4
permuter_control_5=5
permuter_control_6=6
permuter_control_7=7

Then each group of 8 requests has their lowest two signals reversed and the result is rotated right by eight, except for the top bit in each byte. Hence, the input and output columns become:

| | |
|---|---|
| input: | 3 3 2 2 2 2 2 2 2 2 2 2 1 1 1 1 1 1 1 1 1 1 0 0 0 0 0 0 0 0 0 0 |
| | 1 0 9 8 7 6 5 4 3 2 1 0 9 8 7 6 5 4 3 2 1 0 9 8 7 6 5 4 3 2 1 0 |
| output: | 3 0 0 0 0 0 0 0 0 2 3 2 2 2 2 2 2 1 2 2 2 1 1 1 1 0 1 1 1 1 0 0 |
| | 1 6 5 4 3 2 0 1 3 0 9 8 7 6 4 5 5 2 1 0 9 8 6 7 7 4 3 2 1 0 8 9 |
| | swp | swp | swp | swp |

3. Column Shuffler Circuit

Figure 9:
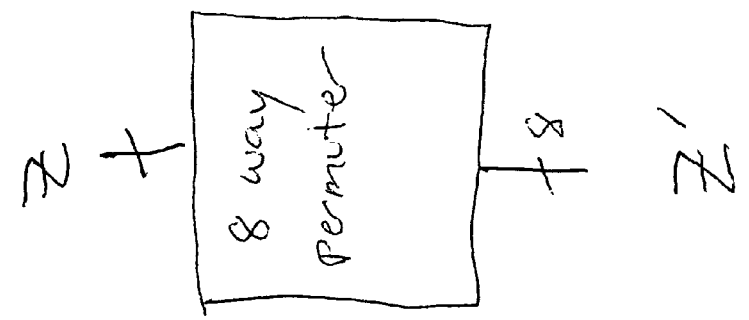
FIG. 9 illustrates a circuit for shuffling columns within a row in accordance with a preferred embodiment of the present invention.
Figure 9:
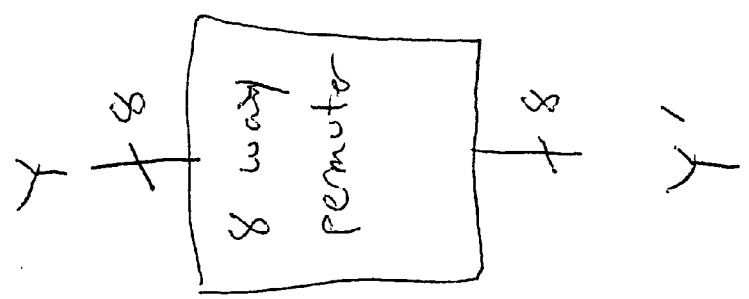
Figure 9:
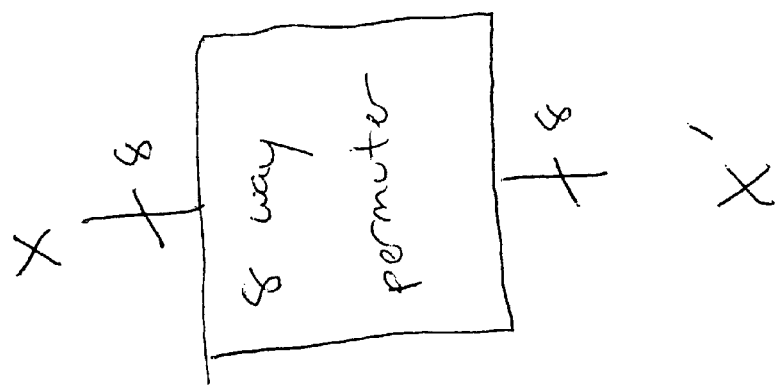
Figure 9:
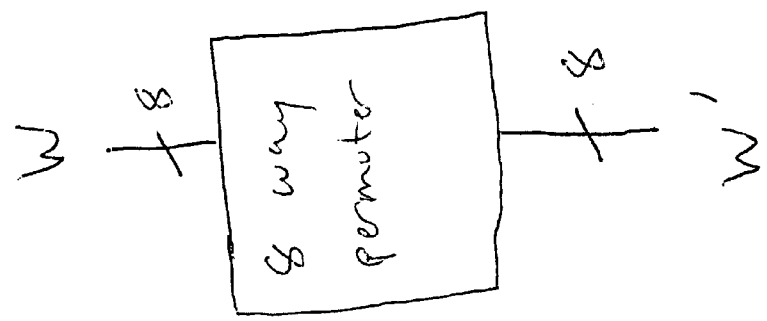

The column shufflers permute the columns and do not utilize shifters. Hence, the column shuffler circuit is simpler than the row shuffler circuit. The circuit for shuffling the columns within a row is illustrated in FIG. 9.

4. Shuffler Controller Circuit

In order to control the shufflers we have to produce the following signals:
col_permuter_control_0[2:0]
col_permuter_control_1[2:0]
col_permuter_control_2[2:0]
col_permuter_control_3[2:0]
col_permuter_control_4[2:0]
col_permuter_control_5[2:0]
col_permuter_control_6[2:0]
col_permuter_control_7[2:0]
row_shifter_control_0[1:0]
row_shifter_control_1[1:0]
row_shifter_control_2[1:0]
row_shifter_control_3[1:0]
row_shifter_control_4[1:0]
row_shifter_control_5[1:0]
row_shifter_control_6[1:0]
row_shifter_control_7[1:0]
row_permuter_control_0[2:0]
row_permuter_control_1[2:0]
row_permuter_control_2[2:0]
row_permuter_control_3[2:0]
row_permuter_control_4[2:0]
row_permuter_control_5[2:0]
row_permuter_control_6[2:0]
row_permuter_control_7[2:0]

Each of these three groups of signals is controlled by a circuit that steps through each of the possible values that the group can take. The timing of when each is stepped on the the subject of the next section. Here we'll just deal with how each of controller works.

The controller for the row shifter controls is a 16 bit counter that counts in steps of 0xb6db. This is easiest to understand looking at it in base 4 (because then each digit controls one of the shifters). So, in base 4 the counter counts:

| shifter_control |
|---|
| 7 6 5 4 3 2 1 0 |
| 0 0 0 0 0 0 0 0 |
| 2 3 1 2 3 1 2 3 |
| 1 2 3 1 2 3 1 2 |
| 0 2 1 0 2 1 0 1 |
| 3 1 2 3 1 2 3 0 |

Note 0xb6db is 23123123 in base 4. The key things about this number are: (i) it is odd, so it has no cofactors with 2^16 (so all possible states are stepped through); and (ii) it has all possible base 4 digits in it (except 0), so the shifter controls all change every cycle, and change relative to each other as much as is possible.

The two sets of permuters are controlled by identical circuits. The job of the permuter controllers is to step through all 8! possible permutations. As all permutations are used we can be sure that the results will be fair in the long term. However, the permutations must be stepped through in a 'good' order such as to ensure a high level of short term fairness.

Remember the aim of the permuter controllers is to produce all possible permutations of the numbers 0, 1, 2, 3, 4, 5, 6 and 7.

The first thing the permuter controller have to do is to have a way of stepping though all 8! (or 40320) states. One way of doing this would be to simply have a modulo 40320 counter. However, if it was done this way, it would then be very hard to decode this state into signals suitable for controlling the permuters. So, in a preferred embodiment, the method uses seven counters:
cnt0 counts from 0 to 7
cnt1 counts from 0 to 6 when cnt0 wraps
cnt2 counts from 0 to 5 when cnt1 wraps
cnt3 counts from 0 to 4 when cnt2 wraps
cnt4 counts from 0 to 3 when cnt3 wraps
cnt5 counts from 0 to 2 when cnt4 wraps
cnt6 counts from 0 to 1 when cnt5 wraps Thus the sequence of states that the counters go through is:

| cnt0 | cnt1 | cnt2 | cnt3 | cnt4 | cnt5 | cnt6 |
|------|------|------|------|------|------|------|
| 0 | 0 | 0 | 0 | 0 | 0 | 0 |
| 1 | 0 | 0 | 0 | 0 | 0 | 0 |
| 2 | 0 | 0 | 0 | 0 | 0 | 0 |
| . | . | . | . | . | . | . |
| . | . | . | . | . | . | . |
| . | . | . | . | . | . | . |
| 7 | 0 | 0 | 0 | 0 | 0 | 0 |
| 0 | 1 | 0 | 0 | 0 | 0 | 0 |
| 1 | 1 | 0 | 0 | 0 | 0 | 0 |
| . | . | . | . | . | . | . |
| . | . | . | . | . | . | . |
| . | . | . | . | . | . | . |
| 7 | 6 | 5 | 4 | 3 | 1 | 1 |
| 7 | 6 | 5 | 4 | 3 | 2 | 0 |
| 7 | 6 | 5 | 4 | 3 | 2 | 1 | and back to the start

This is 8*7*6*5*4*3*2=40320 possible states which is just what we wanted. In order to make testing easier these counters can be loaded from registers accessible to the OOB bus.

Now that we have a way of stepping through all of the possible states we now need to decode this state into a permutation. This is done using the circuit shown in FIG. 10.

Figure 10:
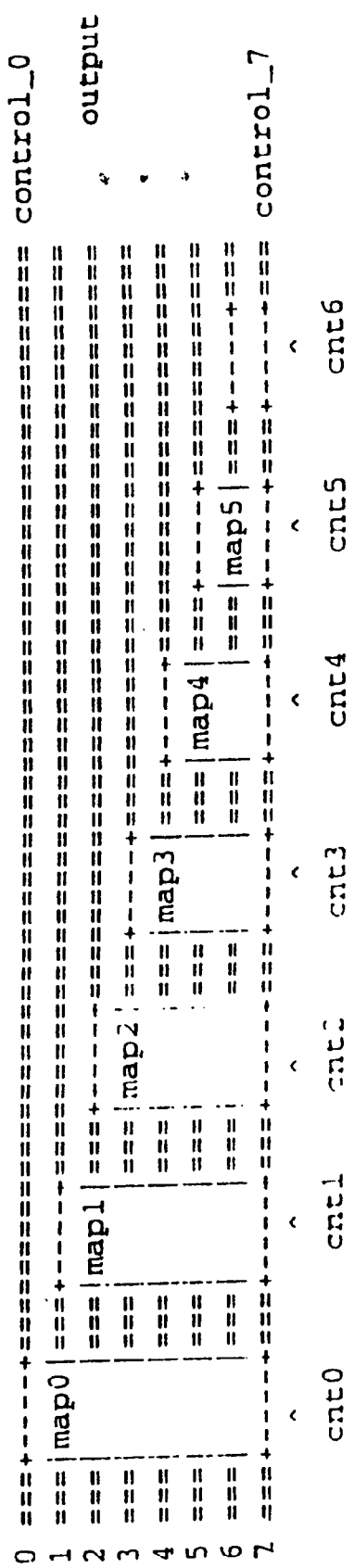
FIG. 10 illustrates a circuit for decoding a state into a permutation in accordance with a preferred embodiment of the present invention.

On the left of FIG. 10 the numbers 0 to 7 are fed in. On the far right we get out the eight control signals (control_0 to control_7) that we need to control the permuters. In between the numbers pass through a series of 'mappers' each of which rearranges the numbers in a way that depends on the value of one of the counters.

As cnt0 can have one of eight possible values (0 to 7), map0 must be able to do 8 possible mappings. Similarly mapi must be able to do one of 7 possible mappings. If barrel shifters are used to do the mappings, the short term fairness of the arbiter becomes compromised. A more clever solution is required to ensure a high level of short-term fairness.

The mappings that each mapper does is carefully chosen to give good short term fairness. The mapping that map0 does is shown below:

| | output number (reading top to bottom) | | | | | | | |
|---|---|---|---|---|---|---|---|---|
| cnt0 | 0 | 1 | 2 | 3 | 4 | 5 | 6 | 7 |
| 0 | 0 | 1 | 2 | 3 | 4 | 5 | 6 | 7 |
| 1 | 1 | 0 | 3 | 2 | 5 | 4 | 7 | 6 |
| 2 | 2 | 3 | 0 | 1 | 6 | 7 | 4 | 5 |
| 3 | 3 | 2 | 1 | 0 | 7 | 6 | 5 | 4 |
| 4 | 4 | 5 | 6 | 7 | 0 | 1 | 2 | 3 |
| 5 | 5 | 4 | 7 | 6 | 1 | 0 | 3 | 2 |
| 6 | 6 | 7 | 4 | 5 | 2 | 3 | 0 | 1 |
| 7 | 7 | 6 | 5 | 4 | 3 | 2 | 1 | 0 |

This table shows which input (the numbers shown in the body of the table) is mapped tp which output for each value of cnt0.

if cnt0 is zero then the mapping of inputs to outputs is shown in the first row, and it just wires the inputs straight across to the outputs without rearrangement. If, however, cnt0 is one then the mapping is given by the second row and the output of map0 will be the numbers (reading from top to bottom):

1 0 3 2 5 4 7 6

Similarly the mapping performed by mapI is the following:

| | output | | | | | | |
|---|---|---|---|---|---|---|---|
| cnt1 | 1 | 2 | 3 | 4 | 5 | 6 | 7 |
| 0 | 1 | 2 | 3 | 4 | 5 | 6 | 7 |
| 1 | 2 | 1 | 4 | 3 | 6 | 7 | 5 |
| 2 | 3 | 4 | 1 | 2 | 7 | 5 | 6 |
| 3 | 4 | 5 | 6 | 7 | 1 | 2 | 3 |
| 4 | 5 | 3 | 7 | 6 | 2 | 1 | 4 |
| 5 | 6 | 7 | 2 | 5 | 3 | 4 | 1 |
| 6 | 7 | 6 | 5 | 1 | 4 | 3 | 2 |

Note that in this table that in this table the inputs and outputs of mapl are numbered from 1 to 7. This is because the notional input 0 is always wired straight to the notional output 0 (see the picture above).

So, if cnt0 is one and the cnt1 is one then we will get:

| After map0: | | | | | | | |
|---|---|---|---|---|---|---|---|
| 1 | 0 | 3 | 2 | 5 | 4 | 7 | 6 |
| After map1: | | | | | | | |
| 1 | 3 | 0 | 5 | 2 | 7 | 6 | 4 |

The complete set of mappings in a similar format is shown below:

map[0][0]=[0,1,2,3,4,5,6,7];
map[0][1]=[1,0,3,2,5,4,7,6];
map[0][2]=[2,3,0,1,6,7,4,5];
map[0][3]=[3,2,1,0,7,6,5,4];
map[0][4]=[4,5,6,7,0,1,2,3];
map[0][5]=[5,4,7,6,1,0,3,2];
map[0][6]=[6,7,4,5,2,3,0,1];
map[0][7]=[7,6,5,4,3,2,1,0];
map[1][0]=[1,2,3,4,5,6,7];
map[1][1]=[2,1,4,3,6,7,5];
map[1][2]=[3,4,1,2,7,5,6];
map[1][3]=[4,5,6,7,1,2,3];
map[1][4]=[5,3,7,6,2,1,4];
map[1][5]=[6,7,2,5,3,4,1];
map[1][6]=[7,6,5,1,4,3,2];
map[2][0]=[2,3,4,5,6,7];
map[2][1]=[3,2,5,4,7,6];
map[2][2]=[4,5,6,7,2,3];
map[2][3]=[5,4,7,6,3,2];
map[2][4]=[6,7,2,3,4,5];
map[2][5]=[7,6,3,2,5,4];
map[3][0]=[3,4,5,6,7];
map[3][1]=[4,3,6,7,5];
map[3][2]=[5,6,7,3,4];
map[3][3]=[6,7,4,5,3];
map[3][4]=[7,5,3,4,6];
map[4][0]=[4,5,6,7];
map[4][1]=[5,4,7,6];
map[4][2]=[6,7,4,5];
map[4][3]=[7,6,5,4];

map[5][0]=[5,6,7];
map[5][1]=[6,7,5];
map[5][2]=[7,5,6];
map[6][0]=[6,7];
map[6][1]=[7,6];

Where the input attached to output P by mapper M for count value C is given by map[M][C][P−M] (The minus M term comes about because the inputs and outputs of each mapper are labeled starting from M because the first M 'inputs' and 'outputs' are just wired straight through).

So in summary the shuffler controller consist of one counter to control the row shifters, one permuter controller to control the column permuters and a further permuter controller to control the row permuters.

One other thing to note is that there is a one cell time delay through the mappers. This means the permuter control values do not change until one cycle after the counters in the permuter controllers change. There is no corresponding delay in the shifter controller. This means that if the permuter counters change at the same time as the shifter counter (which they do often) there will be period of one cell time where the new shift is used with the old permute.

5. Grant Deshufflers

Now is probably a good time to explain how the grant deshufflers work. The deshufflers use exactly the same circuitry as the shufflers, except that now the shifters come before the permuters. Obviously, they need different control signals to be able to perform the inverse mapping. These are calculated as follows:

deshifter_control_X=4−shifter_control_X depermuter_control_X is calculated using the following algorithm:

for (I=0;I<8;I++)
  if (permuter_control_I=X)
    depermuter_l control_X=I

6. Advancing the Shuffle Control

Two 16 bit counters in the shifter controllers and two permuter controllers each with 40320 states. We need to control how each of these advances so that we meet two conditions:

(i) All 65536*40320*40320 (~10^14)
(ii) The shuffle used changes as often as possible (to get the best short term fairness).

This is done by having 3 counters—one for controlling the advancing of the row shifters, one for the row permuters and one for the column permuters. These counters count once per cell time. The counters each count modulo some prime number to ensure that all of the possible combinations of counters are seen eventually.

The relevant shifter or permuter is advanced when its counter has certain values. These values are chosen so that the shifter is advanced exactly 65536 times during one period of its counter, and each permuter is advanced exactly 40320 times during the period of its counter.

Here are the periods and the advance conditions for each counter:

| Counter for | Period | Advance when |
|---|---|---|
| row_shift | 65537 | count != 65536 |
| row_permute | 161281 | count&0x3 = = 0x3 |
| col_permute | 1376257 | count&0x1f = = 0x1f) && (count&0x1ff != 0x1ff) |

So, for example, the row shifter is advanced every cell time except one in 65537. So, in summary:

(i) the advancer controls when the shifter controller's counter and the permuter controllers' counters move on to the next state.
(ii) the shifter controller is a sixteen bit counter that counts in carefully chosen increments.
(iii) each permuter controller consists of a set of counters that hold the current state (one of N!). These counters feed into a set of mappers that produce a permutation of the numbers 0, 1, 2, 3, 4, 5, 6 and 7. There is one permuter controller for the row permutes and one for the column permutes.
(iv) the shufflers are made up of two sets of permuters and two set of shifters. These are controlled by the permuter controllers' mapper outputs and the shifter controllers counters respectively.

7. Choosing the Shuffling Sequence

The sequence of mappings was chosen by arranging all possible permutations in sorted order (the sorting was done by just taking each one as an 8 digit number and putting them into order lowest to highest)

01234567
01234576
01234657
01234756
01234765
01235467

Then the algorithm is as follows:

(i) start with the first permutation (this is the first mapping)
(ii) search forward through all the permutations for another permutation which is different in as many positions as possible from the first mapping. This gives the second mapping.
(iii) search forward through all the permutations for another permutation which is different in as many positions as possible from both the first and second mappings. This gives the third mapping.
(iv) repeat for all the other mappings you need.

This gives the mapper config we use:

| 0 | 1 | 2 | 3 | 4 | 5 | 6 | 7 |
|---|---|---|---|---|---|---|---|
| 1 | 0 | 3 | 2 | 5 | 4 | 7 | 6 |
| 2 | 3 | 0 | 1 | 6 | 7 | 4 | 5 |
| 3 | 2 | 1 | 0 | 7 | 6 | 5 | 4 |
| 4 | 5 | 6 | 7 | 0 | 1 | 2 | 3 |
| 5 | 4 | 7 | 6 | 1 | 0 | 3 | 2 |
| 6 | 7 | 4 | 5 | 2 | 3 | 0 | 1 |
| 7 | 6 | 5 | 4 | 3 | 2 | 1 | 0 |

The other mappers are chosen in the same way.

8. Results of Simulations

Figure 12A:
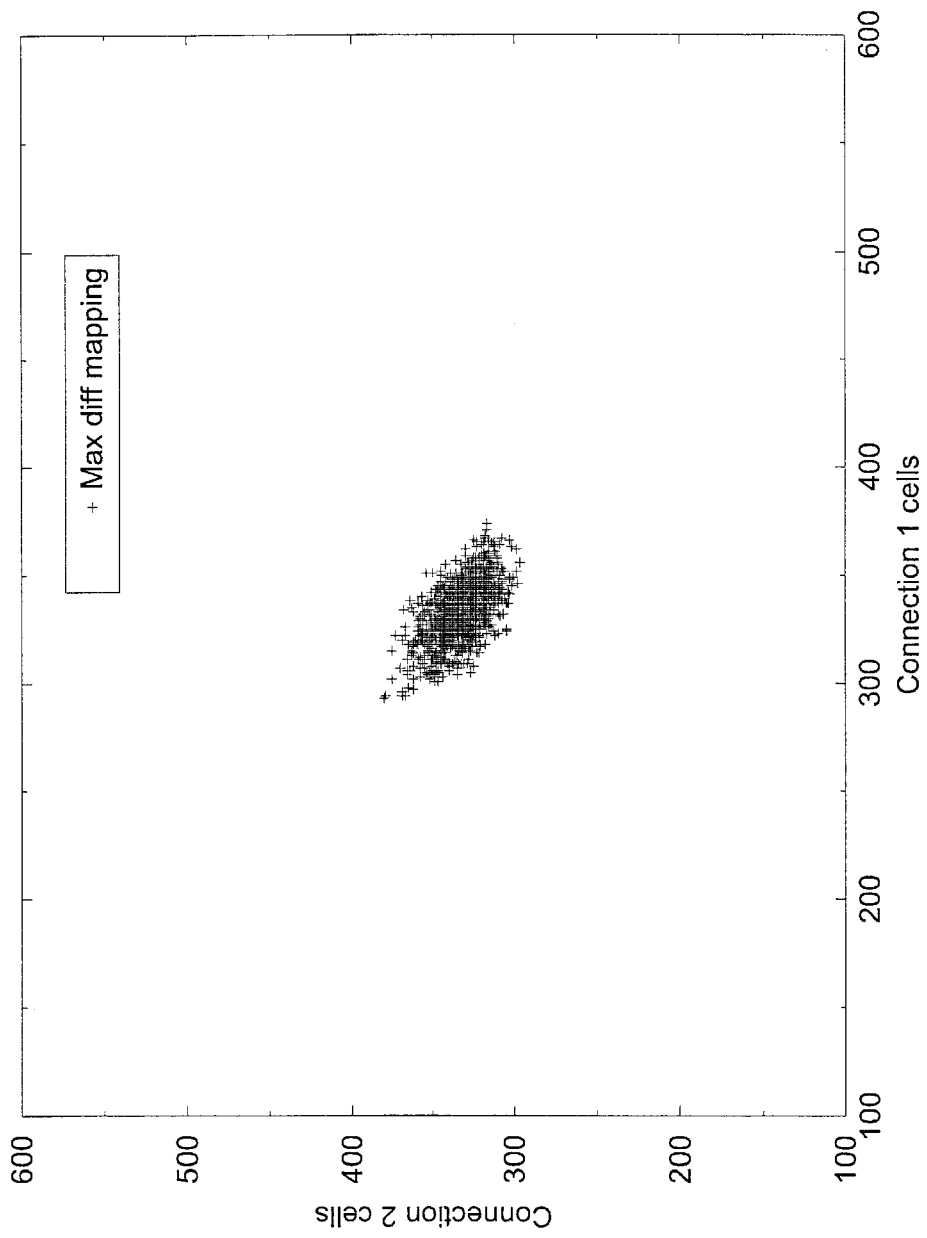
FIG. 12A illustrates simulation results for an algorithm in accordance with a preferred embodiment of the present invention.
Figure 12B:
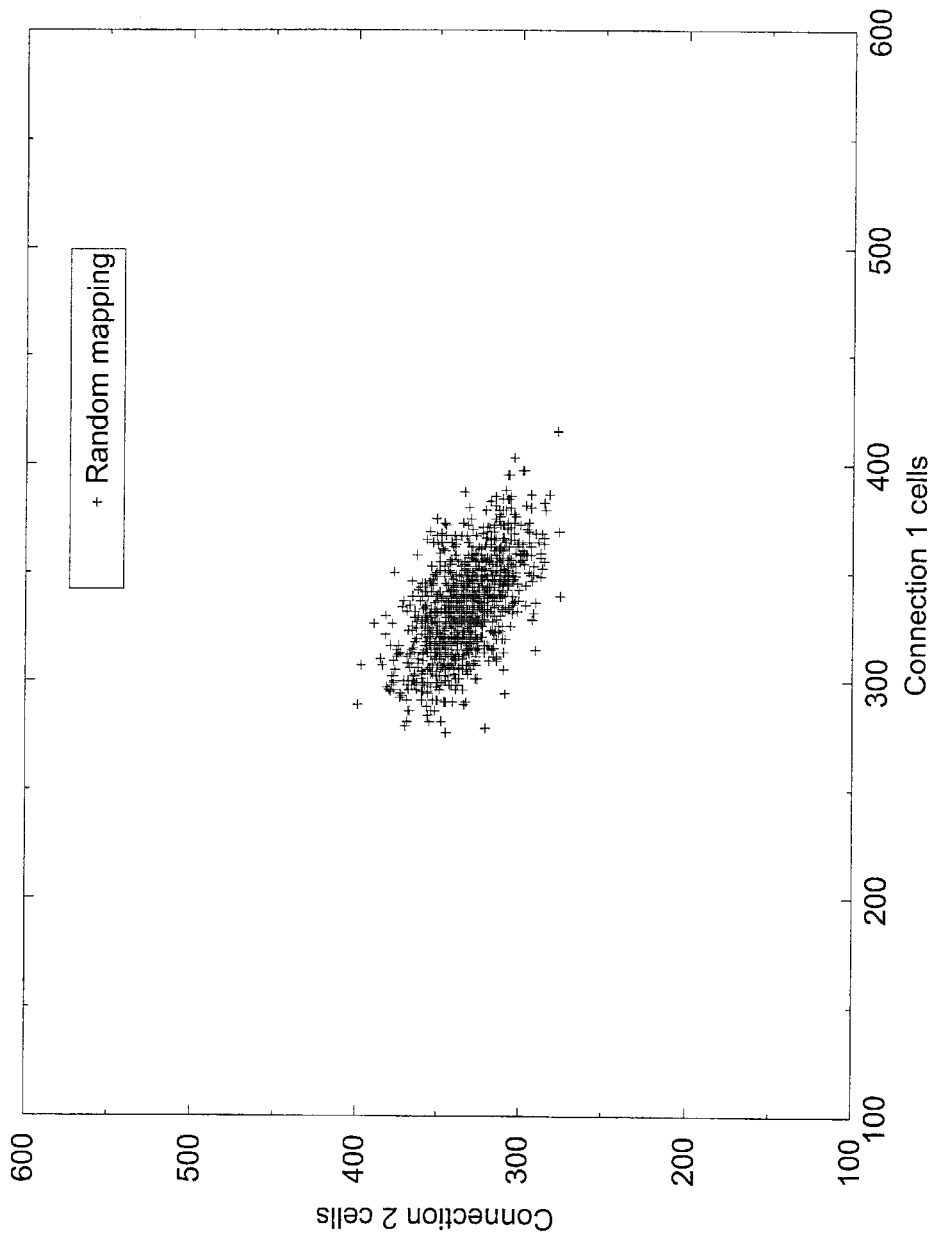
FIG. 12B illustrates simulation results for an algorithm with random mapper configs.
Figure 12C:
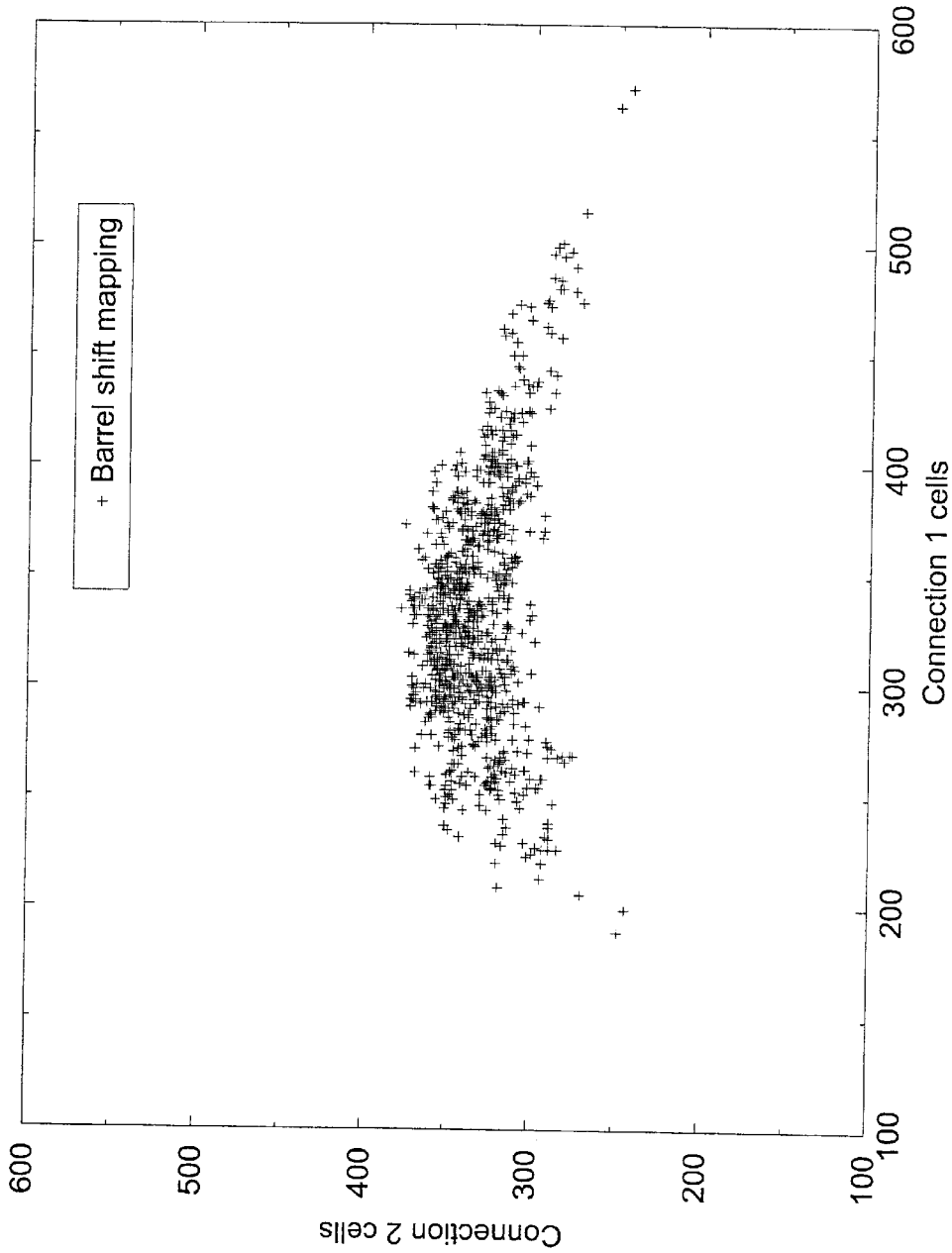
FIG. 12C illustrates simulation results for an algorithm with poorly chosen mapper configs.

FIGS. 12A, 12B, and 12C include graphs showing results of simulating three different algorithms. The algorithms are:

(i) max diff—where mapper configs were chosen in accordance with a preferred embodiment of the present invention;

(ii) random—where mapper configs were chosen randomly; and (ii) barrel shift—where mapper configs were chosen poorly.

The simulation was of three input ports trying to send as fast as they could to one output port. Each run was 1000 cell times. If the scheduling algorithm were perfectly fair each input port would get 333 cells through to the output port in the 1000 cell times (well, one would get 334 of course).

Each point on the graph represents a single run of 1000 cell times. The x and y axis show the number of cells the first and second connections got (the third could be calculated from these).

A perfectly fair algorithm would give a single point at 333,333. The figures shows that max diff (FIG. 12A) is better than random (FIG. 12B) and better than barrel shift (FIG. 12C) because the runs are more tightly clustered around the perfect point. for the max diff.

9. Multicast

The above description focuses on unicast connections. In a preferred embodiment of the present invention, the scheduler 106 includes both unicast and multicast arbiters. The unicast arbiter comprises the WWFA arbiter described above. The multicast arbiter is separate. In a unicast, a cell from one input is sent to one output. In a multicast, a cell from one input is sent to multiple outputs.

Figure 11:
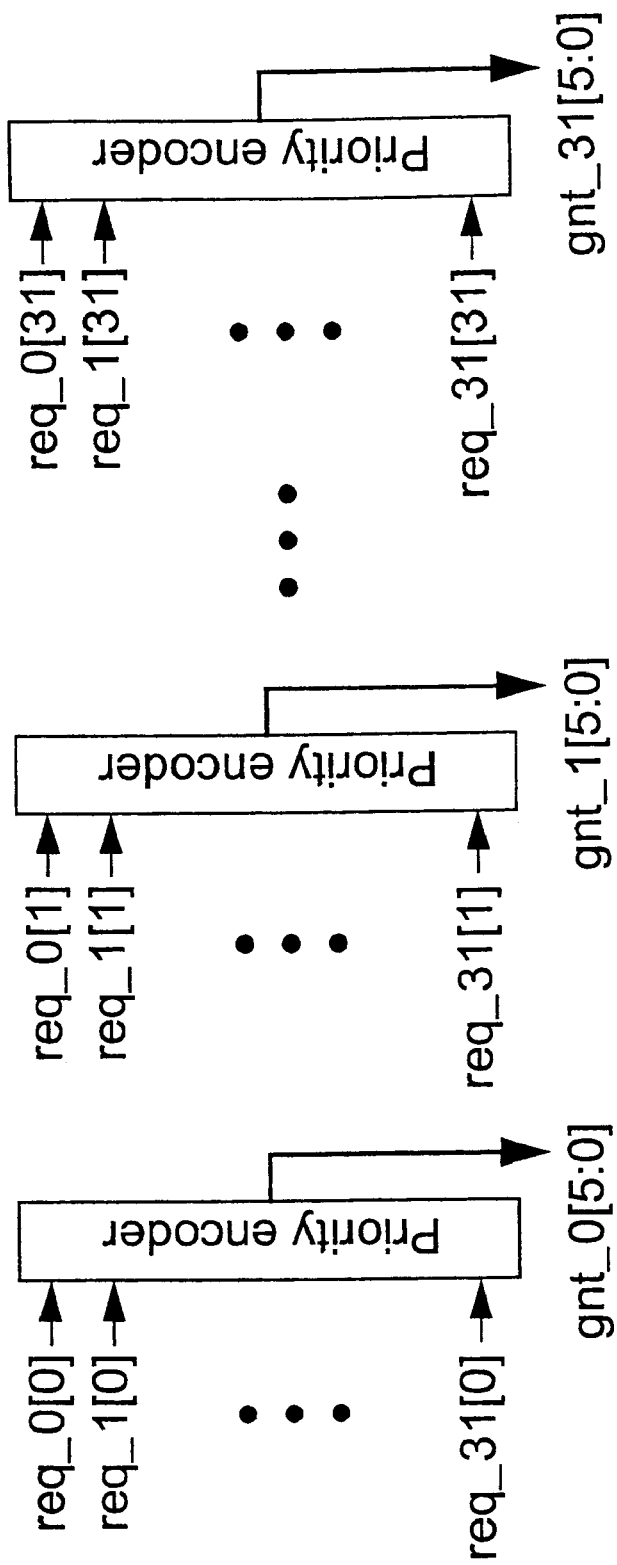
FIG. 11 illustrates multicast arbitration in accordance with a preferred embodiment of the present invention.

FIG. 11 illustrates multicast arbitration in accordance with a preferred embodiment of the present invention. Each port provides a fanout of 32 requests (e.g. req_0[31:0]). Again, the requests are shuffled each cell time to ensure fairness. The resultant grant for each output is determined by a priority encoder, which encodes the number of the highest priority request. In a preferred embodiment, this can complete in a single clock cycle.

In a preferred embodiment, for a given priority level, the multicast arbitration runs first, taking certain inputs and outputs. Subsequently, for that priority level, the unicast arbitration is run and can take any inputs and outputs remaining after the multicast arbitration. In other words, multicasts have higher precedence than unicast, at the same priority level. So the order to decide which request to grant is M0>U0>M1>U1>M2>U2>M3>U3. Consequently the outputs from the priority encoders are fed to the out free j inputs of the unicast WWFA arbiter: if any multicast request is granted at gnt_j then out_free j is set to indicate the output is used. Equally, in_free i is set if at least one of the fanout of multicast req_i is granted.

In a preferred embodiment, the multicast arbitration takes place 4 cycles before the corresponding unicast arbitration. This allows the multicast grant shufflers to use the same "shuffle" value as the unicast request shufflers.

The multicast arbiter may be simpler than the unicast arbiter. Each output (column) "picks" the lowest number input (row) that is requesting it. This may be thought of as a "wave" sweeping down from the top row to the bottom row which grants the first request it sees. This simplicity derives from the fact that there is one constraint in multicast arbitration—each output can only be granted once. In contrast, there is also an input constraint in the unicast case.

The above description relates to specific embodiments which are merely illustrative of one application of the principles of the present invention. Numerous modifications may be made to the specific embodiments described without departing from the true spirit of the invention.

What is claimed is:

1. A method for allocating paths disposed between sources and destinations and through a crossbar switch, the method comprising:

shuffling of an assignment of the destinations across a first dimension of the crossbar switch;

shuffling of an assignment of the sources across a second dimension of the crossbar switch; and performing a wrapped wave front arbitration across the crossbar switch to allocate the paths through the crossbar switch, wherein said shuffling achieves both short and long term fairness in allocation, wherein said shuffling a comprises deterministic shuffling, and wherein said shuffling of the assignment of the destinations comprises permutation of the assignment of the destinations across the first dimension.

2. The method of claim 1, wherein the crossbar switch is used for connecting the sources to the destinations in a router or switch.

3. The method of claim 1, wherein the first and second dimensions comprise respectively columns and rows, or vice-versa.

4. The method of claim 1, wherein said deterministic shuffling of the assignment of sources comprises permutation and shifting of the assignment of sources across the first dimension.

* * * * *